US012693271B2

(12) United States Patent
Matheson et al.

(10) Patent No.: US 12,693,271 B2
(45) Date of Patent: Jul. 28, 2026

(54) METHOD AND APPARATUS FOR ULTRASONIC TESTING USING TEMPORAL SPARSE FIRING

(71) Applicant: Eclipse Scientific Products Inc., Sherwood Park (CA)

(72) Inventors: Mike Matheson, Owen Sound (CA); Jonathan Lesage, Hamilton (CA); Mohammad Marvasti, Waterloo (CA)

(73) Assignee: ECLIPSE SCIENTIFIC PRODUCTS INC., Sherwood Park (CA)

( * ) Notice: Subject to any disclaimer, the term of this patent is extended or adjusted under 35 U.S.C. 154(b) by 317 days.

(21) Appl. No.: 18/456,829

(22) Filed: Aug. 28, 2023

(65) Prior Publication Data

US 2024/0068993 A1 Feb. 29, 2024

Related U.S. Application Data

(60) Provisional application No. 63/374,092, filed on Aug. 31, 2022.

(30) Foreign Application Priority Data

Oct. 28, 2022 (CA) ................................ CA 3180248

(51) Int. Cl.
G01N 29/34 (2006.01)
G01N 29/06 (2006.01)
G01N 29/44 (2006.01)

(52) U.S. Cl.
CPC ......... G01N 29/34 (2013.01); G01N 29/0609 (2013.01); G01N 29/069 (2013.01);
(Continued)

(58) Field of Classification Search
CPC .. G01N 29/34; G01N 29/0609; G01N 29/069; G01N 29/449; G01N 2291/0289;
(Continued)

(56) References Cited

U.S. PATENT DOCUMENTS

2019/0064120 A1* 2/2019 Yamamoto ......... G01N 29/0645

OTHER PUBLICATIONS

"Phase Coherence Imaging: Principles, applications and current developments", by Camacho et al. (Year: 2020).*
(Continued)

*Primary Examiner* — Xin Y Zhong
(74) *Attorney, Agent, or Firm* — Perry + Currier Inc.

(57) ABSTRACT

Disclosed is a method and apparatus for ultrasonic testing using TSF (Temporal Sparse Firing). For each position of a plurality of positions of a phased array ultrasonic probe, an ultrasonic wave is transmitted into an object using a defined subset of transducer elements and propagation of the ultrasonic wave in the object is observed using receiving elements of the transducer elements to produced raw image data for the position, such that the defined subset changes for adjacent positions of the ultrasonic phased array probe. The raw image data of each position is combined to produce an ultrasonic image of the object. Notably, the ultrasonic image can be produced faster than traditional FMC (Full Matrix Capture) approaches because only a subset of the transducer elements transmit at each position. Meanwhile, diversity provided by the defined subset changing for adjacent positions can mitigate reduction in image quality as in traditional sparse firing.

20 Claims, 17 Drawing Sheets

(52) U.S. Cl.
CPC ... G01N 29/449 (2013.01); *G01N 2291/0289*
(2013.01); *G01N 2291/106* (2013.01)

(58) Field of Classification Search
CPC ......... G01N 2291/106; G01N 29/0645; G01N
29/262
See application file for complete search history.

(56) References Cited

OTHER PUBLICATIONS

"The Delay Multiply and Sum Beamforming Algorithm in Ultra-sound B-Mode Medical Imaging" by Matrone et al. (Year: 2015).*

* cited by examiner

FIG. 8

METHOD AND APPARATUS FOR ULTRASONIC TESTING USING TEMPORAL SPARSE FIRING

RELATED APPLICATION

This patent application claims priority to U.S. Provisional Patent Application No. 63/374,092 filed on Aug. 31, 2022, the entire disclosure of which is hereby incorporated herein by reference.

FIELD OF THE DISCLOSURE

This disclosure relates to ultrasonic testing, and more particularly to methods and apparatuses for ultrasonic testing using sparse firing.

BACKGROUND

Ultrasonic testing of an object involves transmitting ultrasonic waves into the object and observing propagation of those ultrasonic waves to characterize the object and/or detect internal flaws in the object. A common application of ultrasonic testing is thickness measurement, which tests a thickness of an object, for example to monitor pipework corrosion. Other applications are possible. Ultrasonic testing can be performed on many different materials, such as steel, aluminium, other metals, metal alloys, concrete, wood, composites, etc. Ultrasonic testing can be performed in many industries such as steel and aluminium construction, metallurgy, manufacturing, aerospace, automotive, other transportation sectors, etc.

Reflection mode and attenuation mode are two different methods of performing ultrasonic testing. In reflection (or pulse-echo) mode, a transducer performs both sending and receiving of the ultrasonic waves, with the ultrasonic waves being reflected back to the transducer. The reflection occurs from an interface, such as a back wall of the object or from an imperfection within the object. An amplitude of the ultrasonic waves received by the transducer can represent thickness and/or density of the object. In attenuation (or through-transmission) mode, a transmitter sends ultrasonic waves through one surface, and a separate receiver detects an amount of the ultrasonic waves that reaches it on another surface after traveling through the object. Imperfections or other conditions in the object between the transmitter and receiver reduce or otherwise affect the amplitude of the ultrasonic waves that are received, thus revealing their presence.

FMC (Full Matrix Capture) is a method of ultrasonic testing involving a matrix of transducer elements whereby each transducer element has a turn to transmit ultrasonic waves into an object while all other transducer elements observe propagation of those ultrasonic waves. After all of the transducer elements have had their turn as a transmitter and elementary A-Scans are observed, a data matrix can be created based on the elementary A-Scans. Furthermore, the data matrix can be used to generate images that are effectively focused throughout a region of interest, and as such, they are able to show even small flaws in the object. Accordingly, FMC has become popular for applications where accurate sizing and characterization is critical.

The images can be generated from the data matrix, for example using a TFM (Total Focusing Method) algorithm. Once the images have been generated, the elementary A-Scans can be discarded or saved for further post-processing with additional sound paths e.g. TT-T, TT-L, and/or alternative algorithms, e.g. PCTFM (Phase Coherence Total Focusing Method), DMaS (Delay Multiply and Sum), etc. However, the process of acquiring signals and generating the images from the data matrix is slow—meaning that even if the elementary A-Scans are discarded, an achievable scan speed is limited. If multiple imaging modes are to be rendered, the achievable scan speed is further reduced.

Ideally, the full matrix of elementary A-Scans would be retained for a given inspection, allowing any combination of imaging modes and/or post-processing options to be applied for additional detail on detected flaws. However, this generates a huge volume of data, particularly for large aperture probes. Handling this huge volume of data currently makes scanning impractically slow for general inspections and is difficult to store and transfer.

Instead of FMC, a number of alternative firing sequences can be used to reduce an amount of data to be collected and stored, including PWI (Plane Wave Imaging), VSI (Virtual Source Imaging), and sparse firing. Fundamentally, these techniques cut down on the amount of data (consequently increasing scan speeds) at an expense of image quality. Sparse firing is a common approach to reduce data volume/increase scan speed while collecting the elementary A-Scans. It involves transmitting using only a fraction of a total aperture elements. Unfortunately, images rendered from sparse firing can cause increased levels of imaging artefacts and noise compared to FMC.

Therefore, the conventional approaches leave much to be desired. It is an object to improve upon the conventional approaches to address or mitigate some or all of the shortcomings noted above.

SUMMARY OF THE DISCLOSURE

Disclosed is a method and apparatus for ultrasonic testing using TSF (Temporal Sparse Firing). For each position of a plurality of positions of a phased array ultrasonic probe, an ultrasonic wave is transmitted into an object using a defined subset of transducer elements and propagation of the ultrasonic wave in the object is observed using receiving elements of the transducer elements to produced raw image data for the position, such that the defined subset changes for adjacent positions of the ultrasonic phased array probe. The raw image data of each position is combined to produce an ultrasonic image of the object.

Notably, the ultrasonic image can be produced faster than traditional FMC (Full Matrix Capture) approaches because only a subset of the transducer elements transmit at each position. Meanwhile, diversity provided by the defined subset changing for adjacent positions can mitigate reduction in image quality as in traditional sparse firing. The image quality achieved by TSF can be comparable to FMC in some cases and improved over traditional sparse firing.

In some implementations, combining the raw image data of each position to produce the ultrasonic image of the object involves, for each position of the plurality of positions of the ultrasonic phased array probe, blending the raw image data for the position with the raw image data of nearby positions within a defined boundary to generate rendered image data for the position, and combining the rendered image data of each position to produce the ultrasonic image of the object.

In this way, spatial redundancy can be leveraged along a scan axis to decrease the amount of data collected without significantly compromising image quality. TSF is inspired by TAA (Temporal Anti-Aliasing) which is a technique used to mitigate artefacts in the field of computer graphics. In essence, a different reduced transmission sequence is used at each scan position, producing lower quality images which are subsequently combined by running average along the scan axis to reduce increased levels of noise and imaging artefacts caused by using fewer transmissions at each scan location.

In this disclosure, images rendered using TSF are compared with other traditional sparse firing sequences of comparable data volume as well as the complete FMC scans. Criteria for selecting a suitable averaging window for a given probe elevation and scan increment are presented. TSF is found to provide a desirable compromise between image quality and scan speed/data volume and can be used with any reduced transmission sequence/imaging algorithm.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which:

FIG. 8 is a schematic of simulated results showing apparent length sizing for FMC, sparse firing, and TSF;

DETAILED DESCRIPTION OF EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

FMC (Full Matrix Capture) provides detailed images, which is useful for sizing flaws and detection of small defects. Collection of raw FMC data allows additional post-processing algorithms, more information for characterization, enhancement of tip diffractions and small scatterers. Typical post-processing can include additional paths (e.g. TT-T, T-L-T), PCTFM, TFMi (inter-mode TFM), etc.

However, the volume of elementary A-Scan data is very large, which is impractical for typical scan lengths due to transfer scan/speed limitations and storage. Possible approaches to reduce a number of transmissions/stored A-Scans can include traditional sparse firing, PWI (Plane Wave Imaging), Virtual Source, etc. Reducing the number of transmissions comes at the expense of increased image artefacts, so a balance can be made between image quality and FMC data volume/scan speed.

Figure 1:
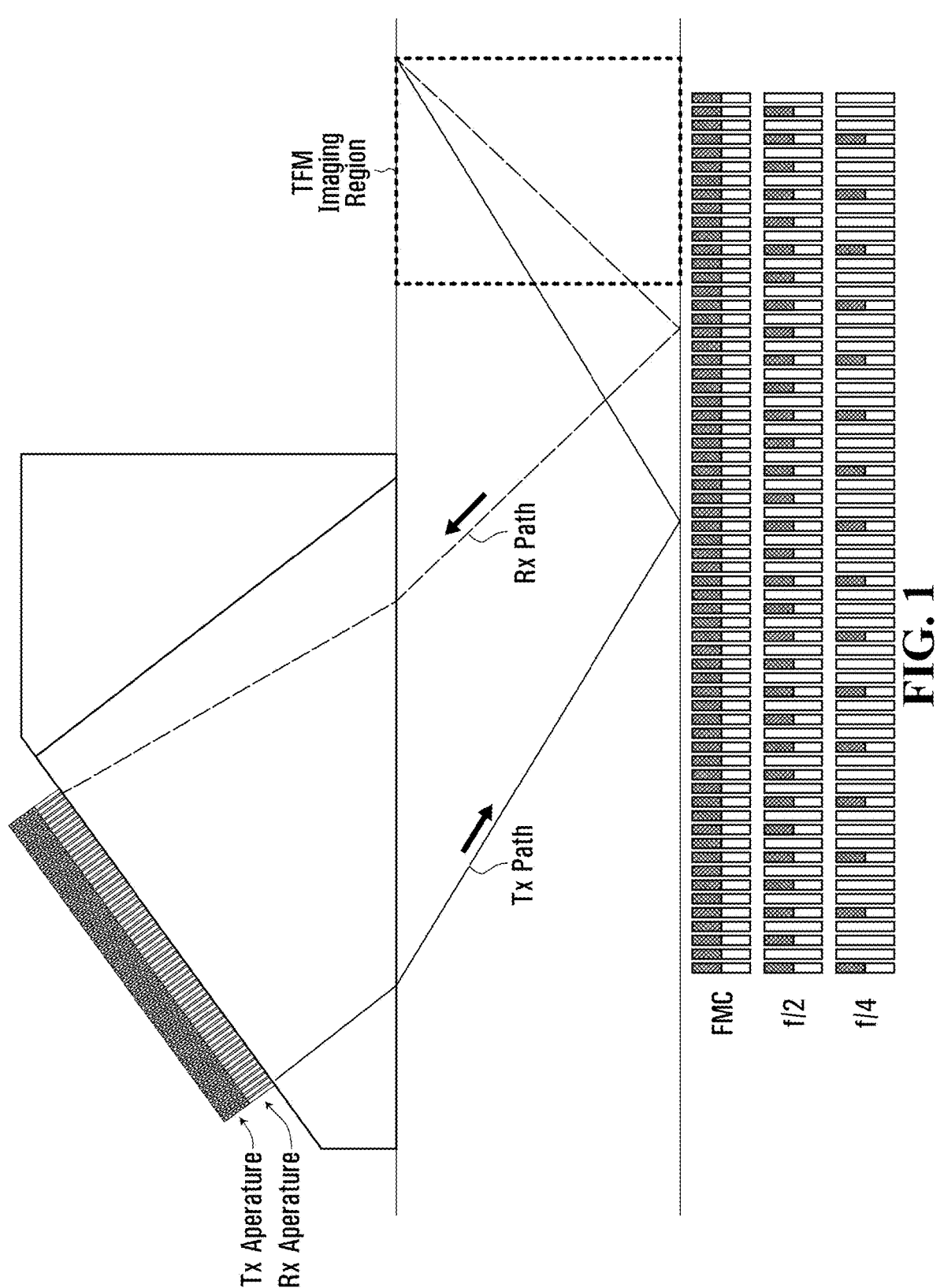
FIG. 1 is a schematic demonstrating traditional sparse firing.

Referring now to FIG. 1, shown is a schematic demonstrating traditional sparse firing. Traditional sparse firing involves transmitting with every $n^{th}$ element while receiving with all array elements. The sequence is repeated at all scan positions using roughly the same aperture length as full FMC, which can preserve tight transmission focus. Fewer elements in transmission increases imaged artefacts and lowers SNR (Signal to Noise Ratio). The PRF (Pulse Repetition Frequency) is increased by a factor of n and the file size is decreased by a factor of n, which may result in a higher scan speed (may have less data to be transferred).

Figure 2A:
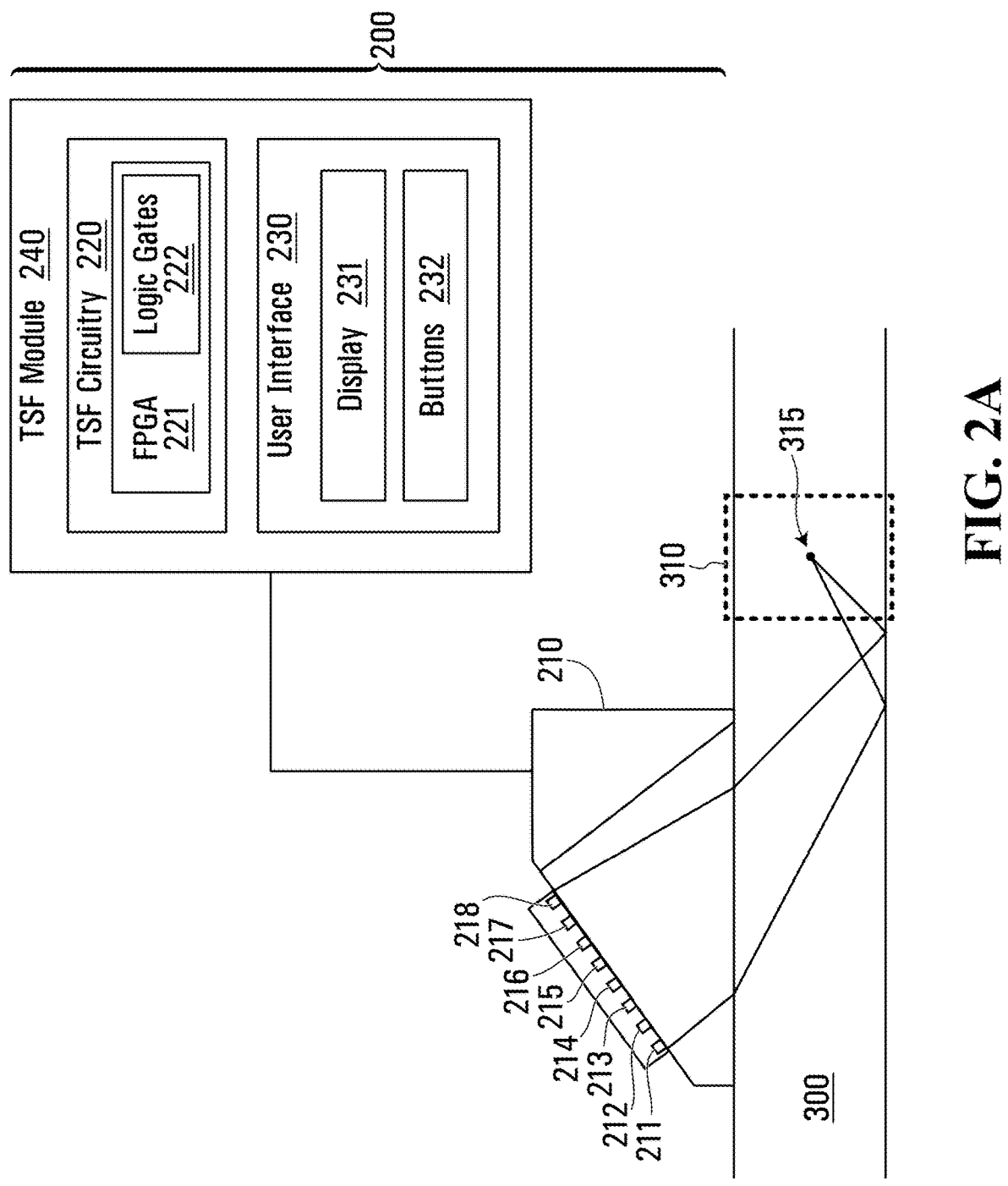
FIGS. 2A and 2B are schematics of an ultrasonic testing apparatus configured for ultrasonic testing of an object using TSF (Temporal Sparse Firing)

Referring now to FIG. 2A, shown is a schematic of an ultrasonic testing apparatus 200 configured for ultrasonic testing of an object 300 using TSF (Temporal Sparse Firing). The ultrasonic testing apparatus has a phased array ultrasonic probe 210 having a plurality of transducer elements 211-218, and TSF circuitry 220 coupled to the phased array ultrasonic probe 210. Although eight transducer elements 211-218 are depicted, it is noted that the number of transducer elements is implementation-specific. Also, in the illustrated example, the TSF circuitry 220 is part of a TSF module 240, which is separate from the phased array ultrasonic probe 210, and may have a user interface 230 as well. However, other implementations are possible, for example the TSF circuitry 220 could instead be integrated with the phased array ultrasonic probe 210.

Figure 3:
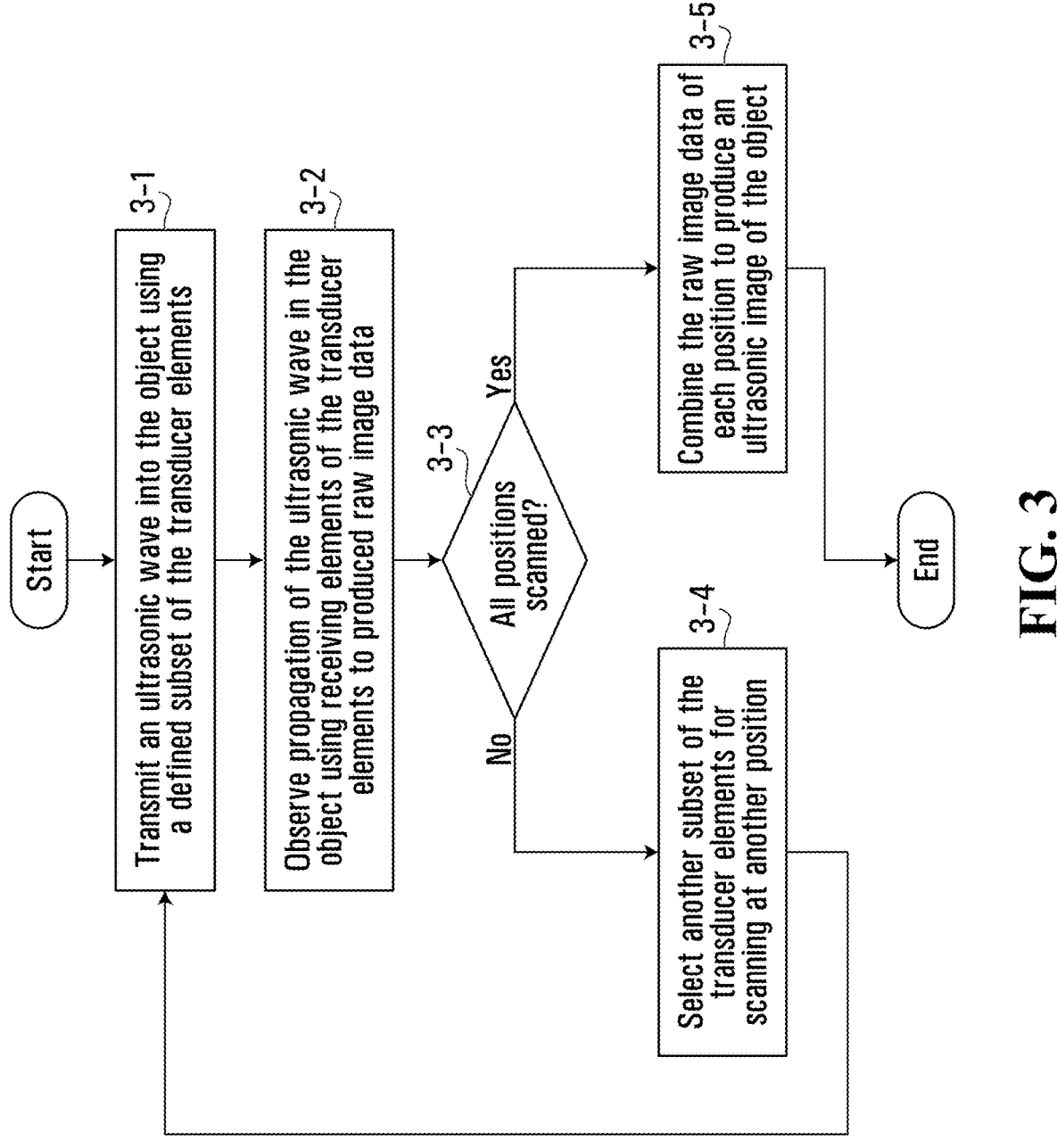
FIG. 3 is a flowchart of a method for ultrasonic testing of an object using TSF.

The TSF circuitry 220 is configured to control the phased array ultrasonic probe 210 to implement a method as described herein. Operation of the ultrasonic testing apparatus 200 will be described below with reference to FIG. 3, which is a flowchart of a method for ultrasonic testing of an object 300 using TSF. Although the method of FIG. 3 is described below with reference to the ultrasonic testing apparatus 200 of FIG. 2A, it is to be understood that the method of FIG. 3 is applicable to other ultrasonic testing apparatuses. In general, the method of FIG. 3 is applicable to any appropriately configured ultrasonic testing apparatus.

At step 3-1, the ultrasonic testing apparatus 200 transmits an ultrasonic wave into the object 300 using a defined subset of the transducer elements 211-218. The defined subset can for example be the transducer elements 211 and 215. In the illustrated example, the phased array ultrasonic probe 210 is angled such that the ultrasonic wave travels diagonally and has an internal reflection towards a point target 315 within a target region 310 of the object 300. However, other implementations are possible, for example the phased array ultrasonic probe 210 being positioned to transmit ultrasonic wave orthogonally to an outside surface of the object 300. At step 3-2, the ultrasonic testing apparatus 200 observes propagation of the ultrasonic wave in the object 300 using receiving elements of the transducer elements 211-218 to produced raw image data. All of the transducer elements 211-218 of the phased array ultrasonic probe 210 can be used as the receiving elements, although alternative implementations are possible in which a subset of the transducer elements 211-218 are used as the receiving elements. Upon completion of steps 3-1 and 3-2, the ultrasonic testing apparatus 200 has complete a scan of the object 300 while the phased array ultrasonic probe 210 is at a current position on the object 300.

If at step 3-3 the ultrasonic testing apparatus 200 has not performed scanning of the object 300 at all positions of the phased array ultrasonic probe 210, then at step 3-4 the ultrasonic testing apparatus 200 selects another subset of the transducer elements 211-218 for scanning at another position of the phased array ultrasonic probe 210 on the object 300, and steps 3-1 and 3-2 are repeated for that position. The defined subset can for example be the transducer elements 212 and 216, and the position of the phased array ultrasonic probe 210 on the object 300 may be moved by a defined amount. Each time steps 3-1 and 3-2 are repeated for a new position of the phased array ultrasonic probe 210 on the object 300, the subset of the transducer elements 211-218 used for transmitting an ultrasonic wave into the object 300 is changed. The scanning at steps 3-1 and 3-2 can be repeated for any suitable number of positions of the phased array ultrasonic probe 210 on the object 300, for example 100 positions, until the target region 310 of the object 300 is scanned.

If at step 3-3 the ultrasonic testing apparatus 200 has performed scanning of the object 300 at all positions of the phased array ultrasonic probe 210 on the object 300, then at step 3-5 the ultrasonic testing apparatus 200 combines the raw image data of each position to produce an ultrasonic image of the object 300. In some implementations, the ultrasonic image is displayed by a display 231 of the user interface 230. A user can interact with the user interface 230 for example using buttons 232 or a touchscreen for example. Note that the TSF module 240 can be coupled to the phased array ultrasonic probe 210 via a cord as shown, although wireless implementations are also possible.

An example of the scanning and combining is provided below for a hypothetical case in which the phased array ultrasonic probe 210 has eight transducer elements 211-218 and the number of transmitting transducers is one-quarter of the total number of elements. In this hypothetical case, the transmitting and observing can for example include:

for position 1: elements 211 and 215 transmit, and raw image data 1 observed,
for position 2: elements 212 and 216 transmit, and raw image data 2 observed,
for position 3: elements 213 and 217 transmit, and raw image data 3 observed,
for position 4: elements 214 and 218 transmit, and raw image data 4 observed,
for position 5: elements 211 and 215 transmit, and raw image data 5 observed, etc.

Furthermore, the combining can for example include:

for position 1: blend of raw image data 1 through raw image data 4,
for position 2: blend of raw image data 1 through raw image data 4,
for position 3: blend of raw image data 1 through raw image data 4,
for position 4: blend of raw image data 1 through raw image data 4, for position 5: blend of raw image data 5 through raw image data 8, etc.

It is to be understood that this hypothetical case is very specific and is provided merely as an example. Other temporal firing patterns are possible for achieving diversity are possible, and other combining methods are possible as well. It is also noted that there would typically be more than eight transducer elements 211-218.

By implementing the method described herein, spatial redundancy can be leveraged along a scan axis to decrease the amount of data collected without significantly compromising image quality. TSF is inspired by TAA (Temporal Anti-Aliasing) which is a technique used to mitigate artefacts in the field of computer graphics. In essence, a different reduced transmission sequence is used at each scan position, producing lower quality images which are subsequently combined by running average along the scan axis to reduce increased levels of noise and imaging artefacts caused by using fewer transmissions at each scan location.

There are many ways that the ultrasonic testing apparatus 200 can combine the raw image data of each position to produce the ultrasonic image of the object. In some implementations, the ultrasonic testing apparatus 200 blends the raw image data for the position with the raw image data of nearby positions within a defined boundary to generate rendered image data for the position, and combines the rendered image data of each position to produce the ultrasonic image of the object. In specific implementations, the blending involves a sliding average operation on the raw image data of the nearby positions within the defined boundary, such that the defined boundary slides in a corresponding manner with the each position of the phased array ultrasonic probe. However, other implementations are possible. However, other implementations are possible and are within the scope of the disclosure.

Figure 4:
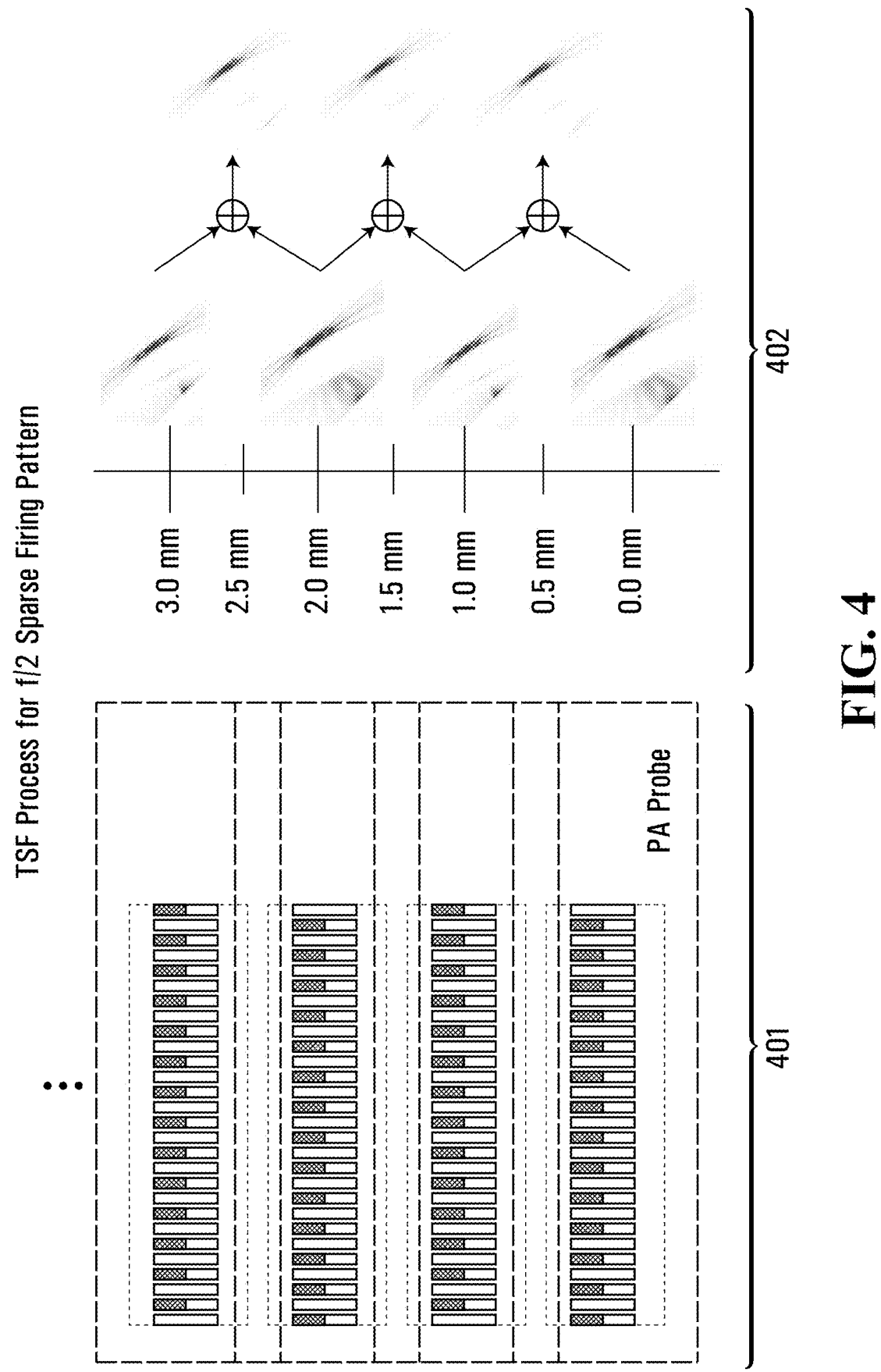
FIGS. 4 and 5 are schematics demonstrating TSF.
Figures 5, 6:
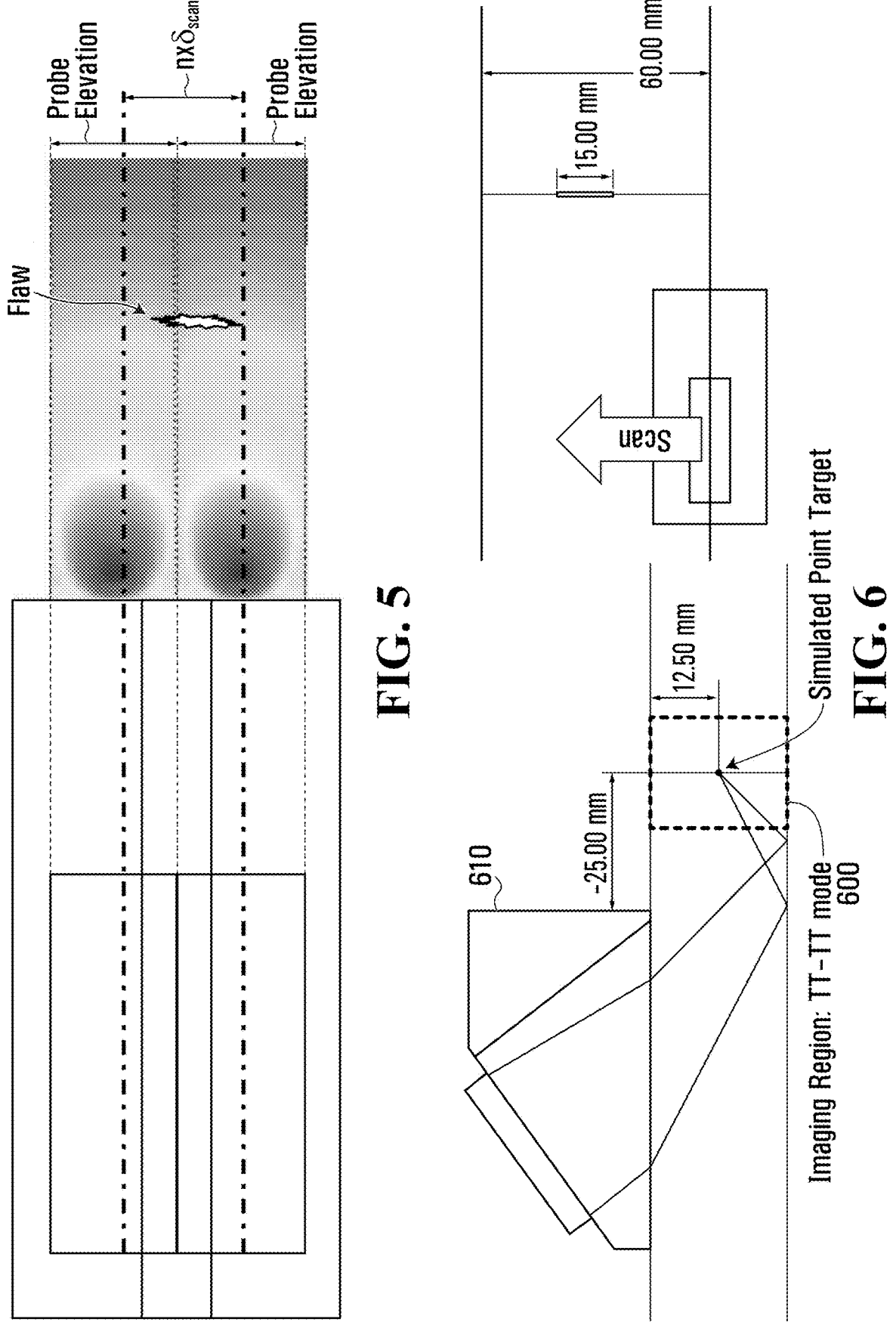
FIG. 6 is a schematic of a setup for simulating results.

Referring now to FIGS. 4 and 5, shown are schematics demonstrating TSF. TSF is modeled on TAA (Temporal Anti-Aliasing), which combines multiple renderings from different frames to reduce aliasing artefacts in computer generated graphics. A start element of f/n sparse firing pattern is incremented with scan position, such that for adjacent scan positions a different subset of the transducer elements are used for transmitting (see left side 401 of FIG. 4). A sub-sequence is repeated every n scan positions until an end of scan is reached. TFM images from adjacent scan positions are combined by a sliding average (see right side 402 of FIG. 4). Alternatively, other imaging algorithms such as PCTFM, and DMaS can be used.

TSF relies on an overlap of a passive aperture field profile between scan positions. There can be a reduction of imaging artefacts achieved by combining additional information from different scan locations and apertures. TSF sub-sequence should span less than the window over which probe is sensitive, roughly: no scan probe elevation (see FIG. 5). An averaging process blends indications from different scan positions and effectively elongates flaws in the scan axis (analogous to ghosting effects with TAA).

In the illustrated examples presented herein, TFM images from adjacent scan positions are combined by a sliding average. However, other implementations are possible, for example using other blending functions for raw images, e.g. sliding maximum pooling or windowed weighted averaging. The blending operation mitigates or eliminate artefacts, and hence rendered images can have better quality than traditional sparse firing approaches.

TSF reduces an amount of elementary A-Scan data collected for FMC based ultrasonic inspections. Different sparse firing sequences are used at each scan position so that blending images rendered from the A-Scan data with adjacent rendered images resulting in a reduction of imaging artefacts and background noise. Like traditional sparse firing approaches, TSF results in a reduction in recorded data and an increase in PRF due to the fact that fewer total transmissions are performed at each scan position. Each image is then blended together with images from adjacent scan locations. This blending operation can substantially reduce imaging artefacts compared with traditional sparse firing approaches without increasing the total of amount data collected.

In the illustrated examples presented herein, the number of transmitting transducer elements can be one-eighth, one-quarter, or one-half of the total number of transducer elements. However, other implementations are possible. More generally, the number of transmitting transducer elements is less than the total number of transducer elements, and hence rendered images can be generated faster than traditional FMC approaches.

Figure 2B:
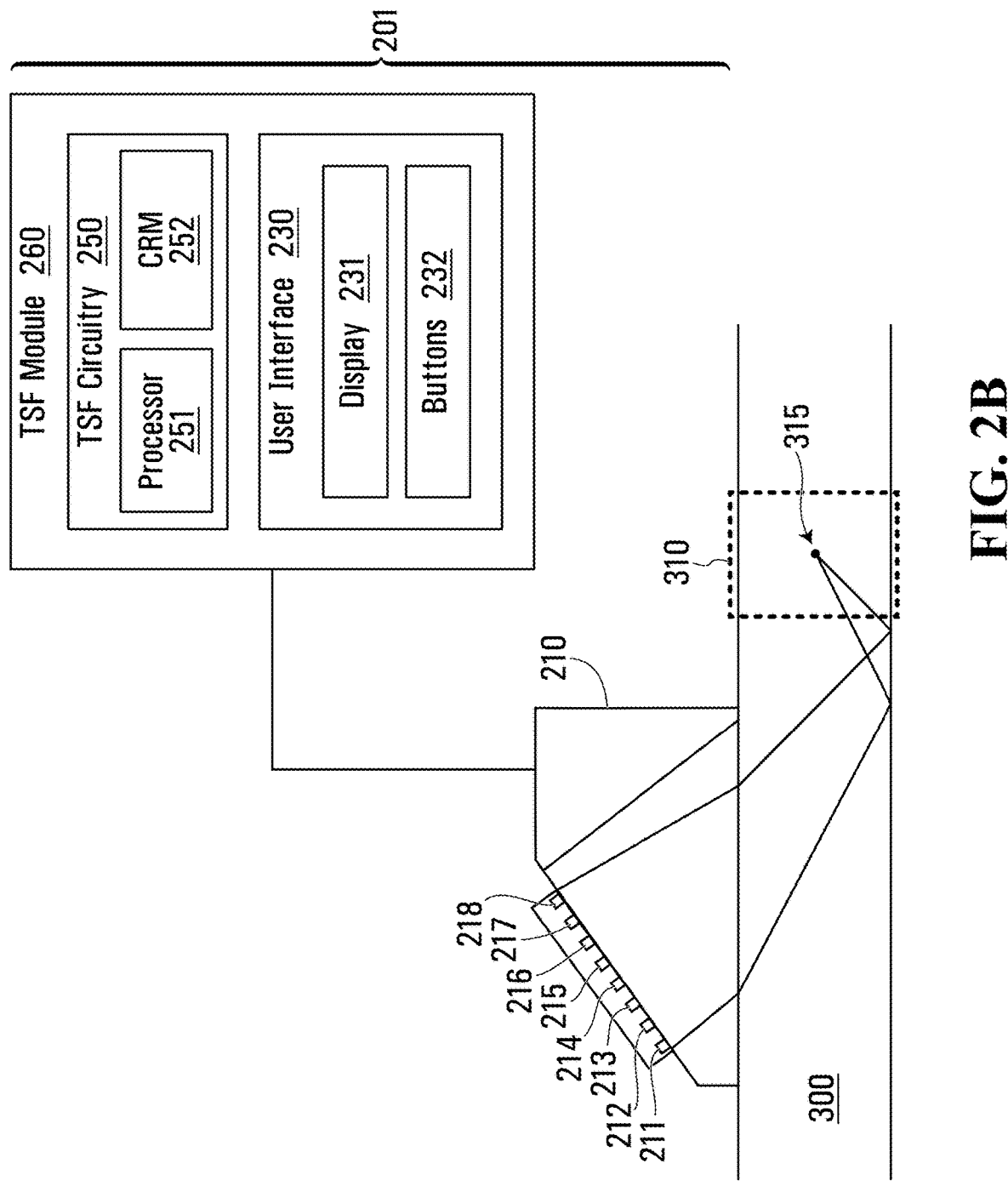

There are many possibilities for the TSF circuitry 220. In some implementations, as shown in FIG. 2A, the TSF circuitry 220 includes an FPGA 221 (Field Programable Gate Array) having logic gates 222 that have been synthesized to implement a method as described herein. In other implementations, as shown in FIG. 2B, the TSF circuitry 250 includes a processor 251 to execute software, which can stem from a computer readable medium 252, to implement a method as described herein. However, other implementations are possible and are within the scope of this disclosure. It is noted that other implementations can include additional or alternative hardware and software components, such as any appropriately configured ASIC (Application-Specific Integrated Circuit) and/or microcontroller, for example. More generally, TSF can be implemented with any suitable combination of hardware, software and/or firmware.

According to another embodiment of the disclosure, as shown in FIG. 2A, there is provided an FPGA 221 (Field Programable Gate Array) having logic gates 222 that have been synthesized such that, when the FPGA 221 is implemented with an ultrasonic testing apparatus 200 having a phased array ultrasonic probe 210 including a plurality of transducer elements 211-218, the logic gates configure the ultrasonic testing apparatus 200 to implement a method as described herein. The FPGA 221 can be synthesized using VHDL (Very High-Speed Integrated Circuit Hardware Description Language), Verilog, or other suitable approaches. In some implementations, the logic gates 222 of the FPGA 221 can be re-synthesized to update the method without physically changing any hardware components of the ultrasonic testing apparatus 200.

According to another embodiment of the disclosure, as shown in FIG. 2B, there is provided a non-transitory computer readable medium 252 having recorded thereon statements and instructions that, when executed by a processor 251 of an ultrasonic testing apparatus 201 having a phased array ultrasonic probe 210 including a plurality of transducer elements 211-218, configure the ultrasonic testing apparatus 201 to implement a method as described herein. The non-transitory computer readable medium 252 can be a computer readable medium 252 of the ultrasonic testing apparatus 201, or some other non-transitory computer readable medium which might be separate from the ultrasonic testing apparatus 201. The non-transitory computer readable medium can for example include an SSD (Solid State Drive), a hard disk drive, a CD (Compact Disc), a DVD (Digital Video Disc), a BD (Blu-ray Disc), a memory stick, or any appropriate combination thereof.

Example details of simulated results, real-world results, and post-processing are provided below. It is to be understood that these details are very specific for exemplary purposes only.

Simulated Results

Referring now to FIG. 6, shown is a schematic of a setup for simulating scanning results of an object 600 by a probe 610. CIVA, which is a commercially available ultrasonic inspection simulation software, is used to simulate 60 mm (1 mm increments) long scan of point target extruded 15 mm through scan axis. FMC data is exported and images are rendered using: full aperture, traditional sparse firing (n=2, 4, 8) and TSF (n=2, 4, 8). A goal is to assess relative performance of TSF against FMC and traditional sparse firing.

Figure 7:
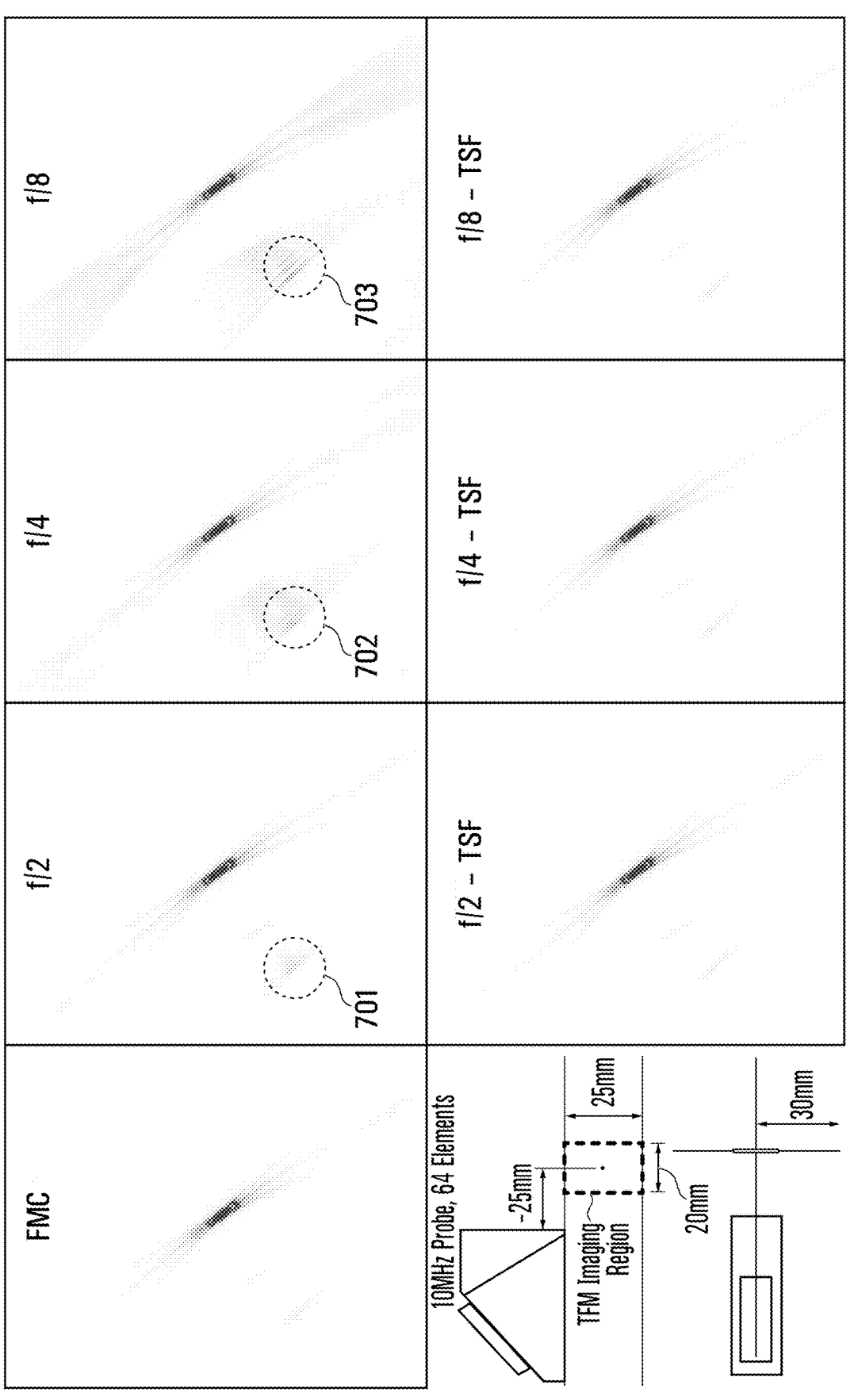
FIG. 7 is a schematic of simulated results showing artefacts for FMC (Full Matrix Capture), sparse firing, and TSF.

Referring now to FIG. 7, shown is a schematic of simulated results showing artefacts for FMC, sparse firing, and TSF. Artefact levels increase with n in traditional sparse firing. See for example artefacts 701-703 in FIG. 7, wherein artefact 703 is more apparent than artefact 702, which in turn is more apparent than artefact 701. However, artefact levels do not increase in the same way with TSF. Thus, TSF appears to achieve image quality that is more comparable to FMC than traditional sparse firing, because the artefacts 701-703 are mitigated or avoided.

Figure 8:
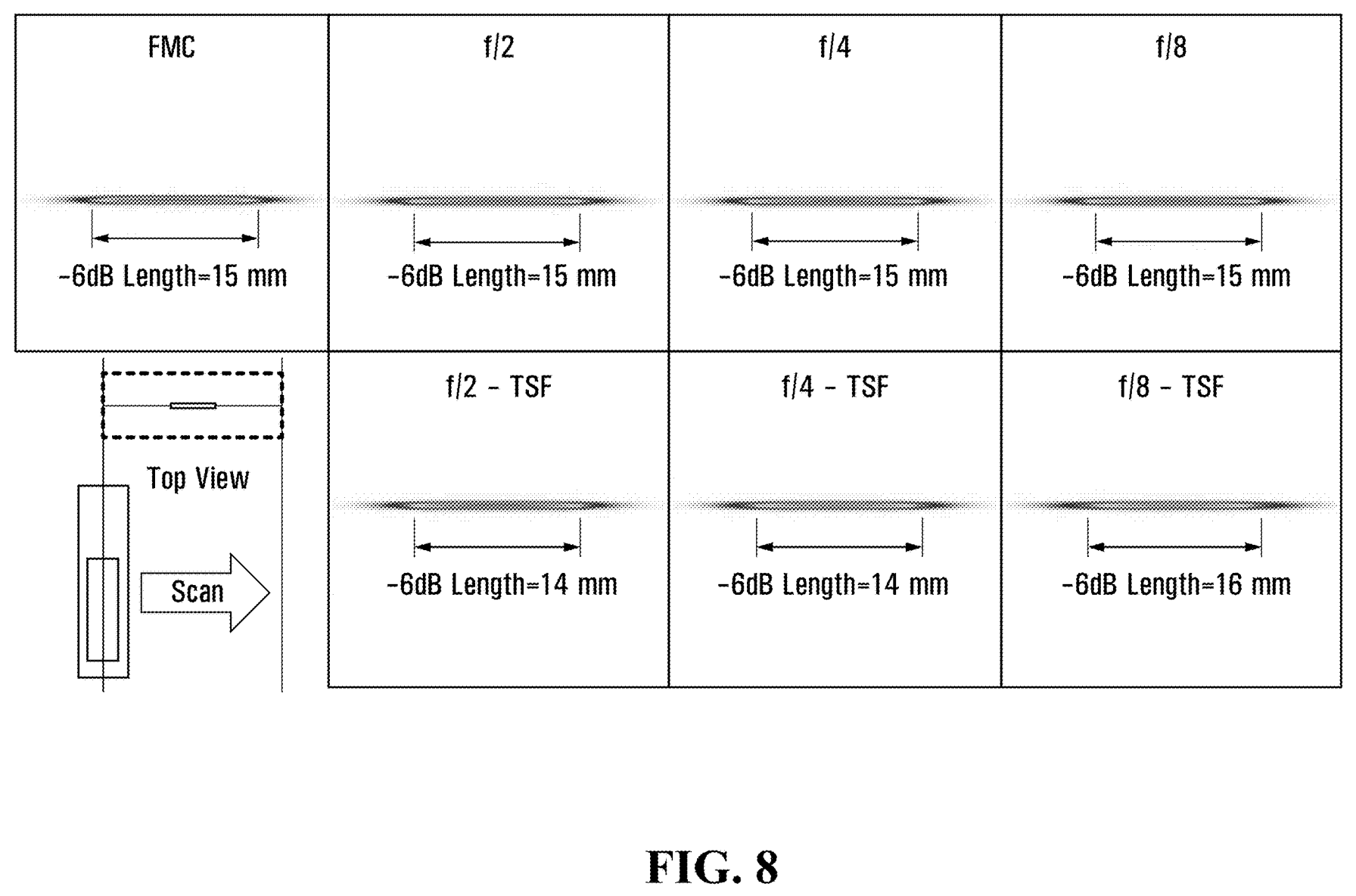

Referring now to FIG. 8, shown is a schematic of simulated results showing apparent length sizing for FMC, sparse firing, and TSF. A −6 dB lengths for all renderings provide close to true length (15 mm), showing that apparent length sizing is generally consistent. There is expected elongation of 1 mm due to TSF moving average process not observed. Therefore, f/8 TSF is a feasible option for standard 10 mm elevation probes.

Real-Word Results

Figure 9:
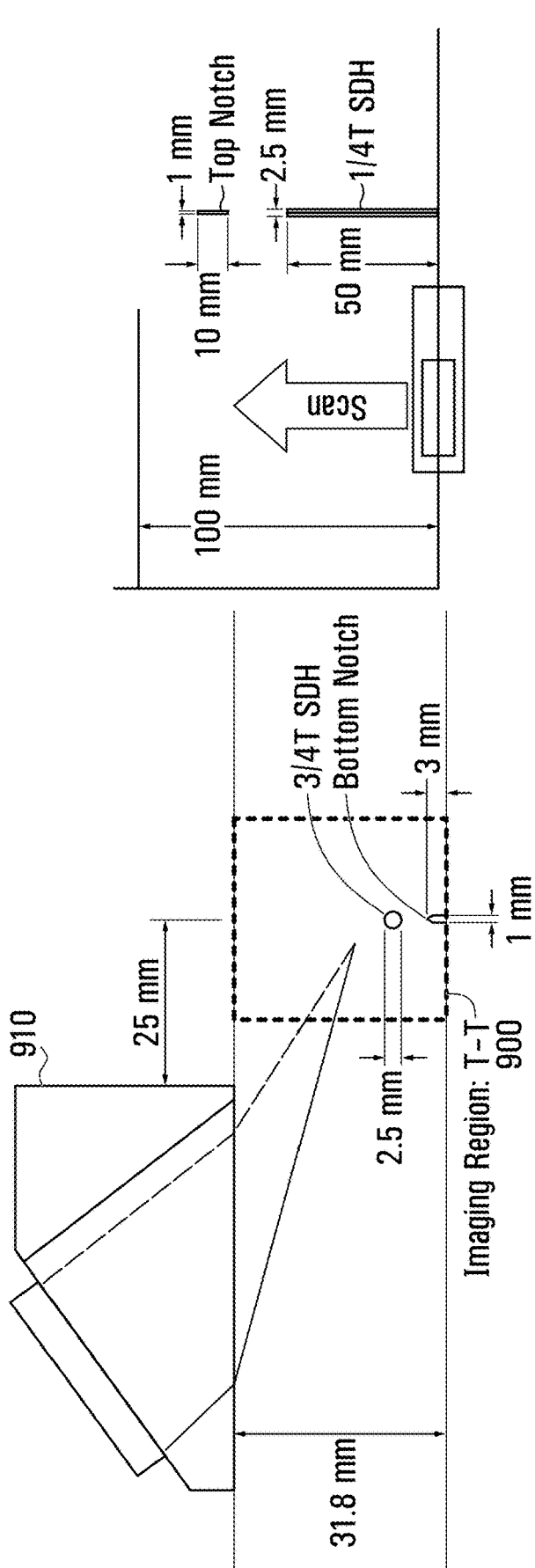
FIG. 9 is a schematic of a setup for a steel calibration block with details of calibration targets, and sample and scan configuration.

Referring now to FIG. 9, shown is a schematic of a setup for a steel calibration block 900 with details of calibration targets, and sample and scan configuration. The steel calibration block 900 is 31.8 mm thick and is scanned at 1 mm increments. A 64 element probe 910 is operated at 10 MHz and 0.5 mm pitch (e.g. Olympus 10L64-A32). FMC data is collected and TFM images are rendered using all transmissions, f/8 and f/8 TSF (TT-TT mode).

Figure 10:
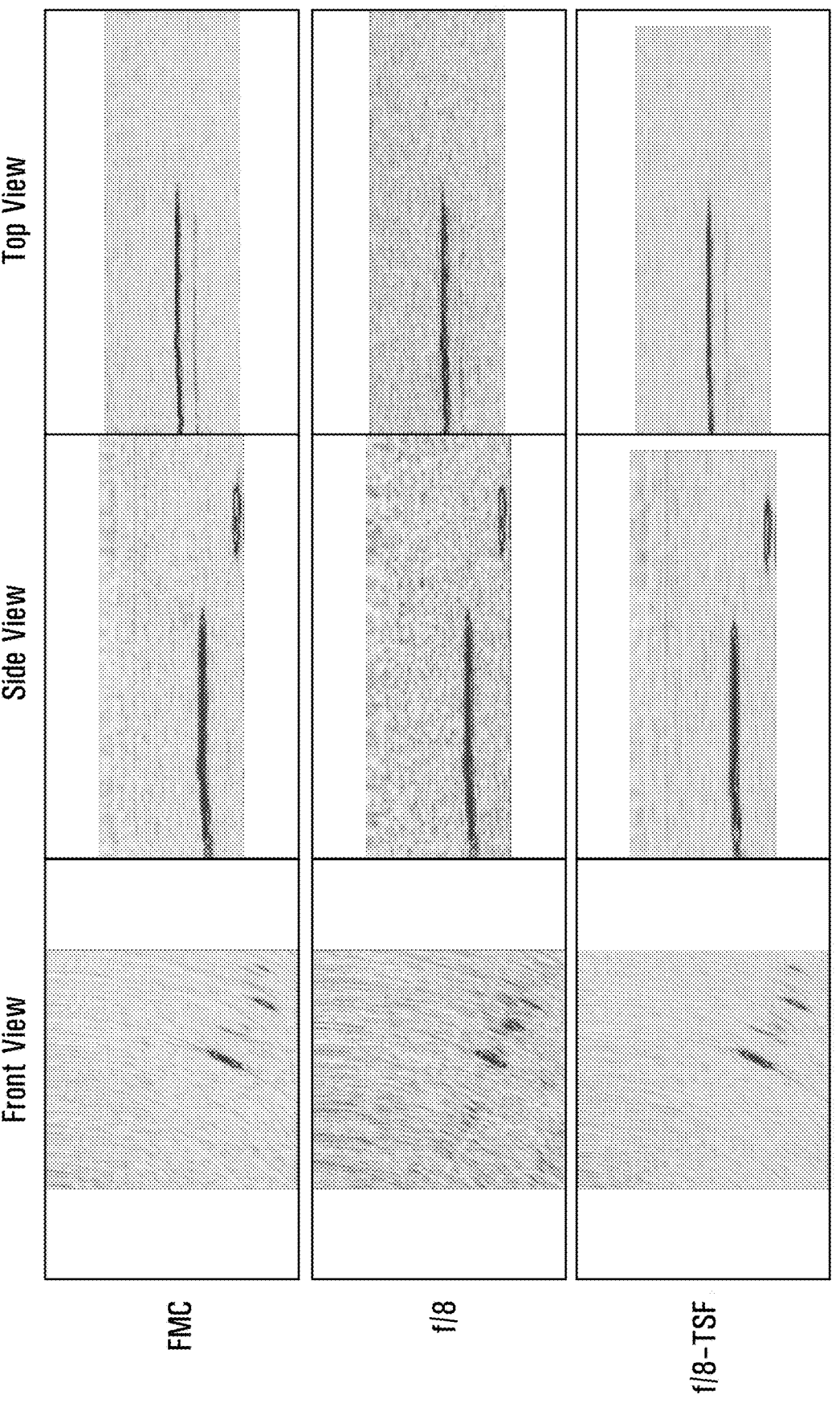
FIG. 10 is a schematic of rendered images for a side drilled hole using FMC, sparse firing, and TSF.

Referring now to FIG. 10, shown is a schematic of rendered images for a side drilled hole using FMC, sparse firing, and TSF. Background noise and artefact levels observed for f/8 TSF images appear to be similar to what is observed for FMC. Coupling loss at beginning of scan is smoothed out in f/8 TSF side view. Background noise and artefact levels appear to be worse with sparse firing. Thus, TSF appears to achieve image quality that is more comparable to FMC than traditional sparse firing.

Figure 11:
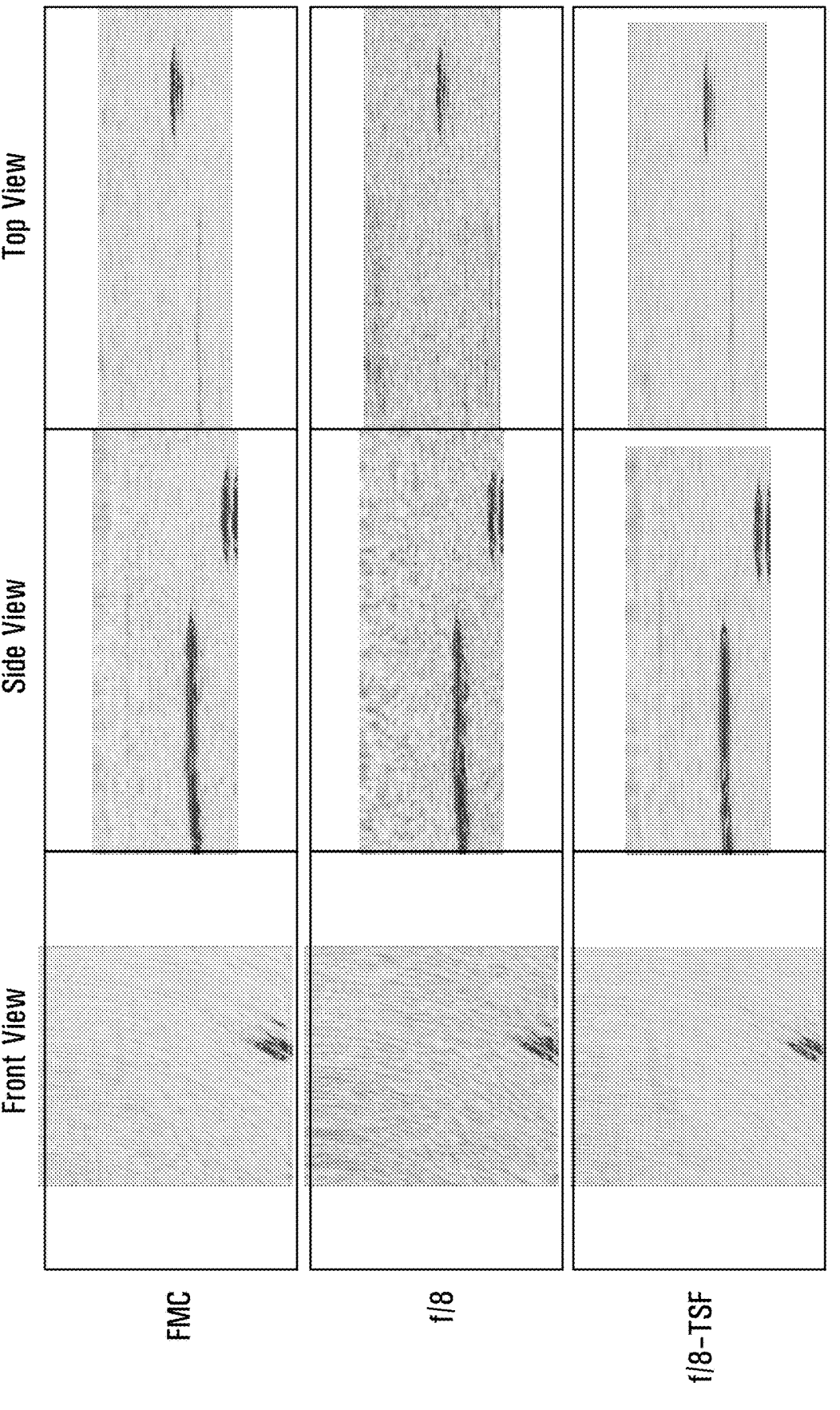
FIG. 11 is a schematic of rendered images for an ID notch using FMC, sparse firing, and TSF.

Referring now to FIG. 11, shown is a schematic of rendered images for an ID notch using FMC, sparse firing, and TSF. Both tip and corner are clear in all renderings. Again, f/8 image quality is poorer than what is observed with FMC and f/8 TSF images. Again, TSF appears to achieve image quality that is more comparable to FMC than traditional sparse firing.

Figure 12:
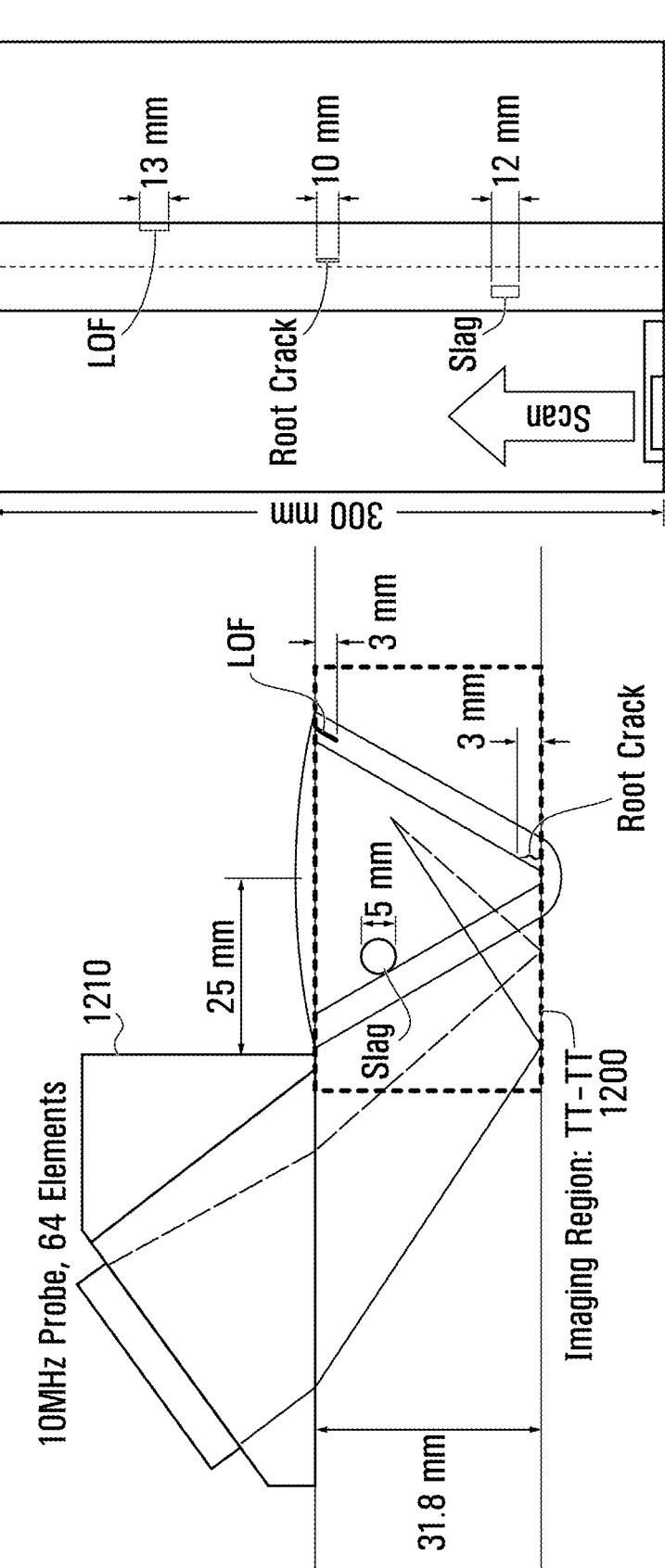
FIG. 12 is a schematic of a setup for a weld plate with details of sample and scan configuration.

Referring now to FIG. 12, shown is a schematic of a setup for a weld plate 1200 with details of sample and scan configuration. A Flawtech sample 1200 with known flaws is scanned in 1 mm increments. A 64 element probe 1210 is operated at 10 MHz and 0.5 mm pitch (e.g. Olympus 10L64-A32). FMC data is collected and TFM images are rendered using all transmissions, f/8 and f/8 TSF (TT-TT mode).

Figure 13:
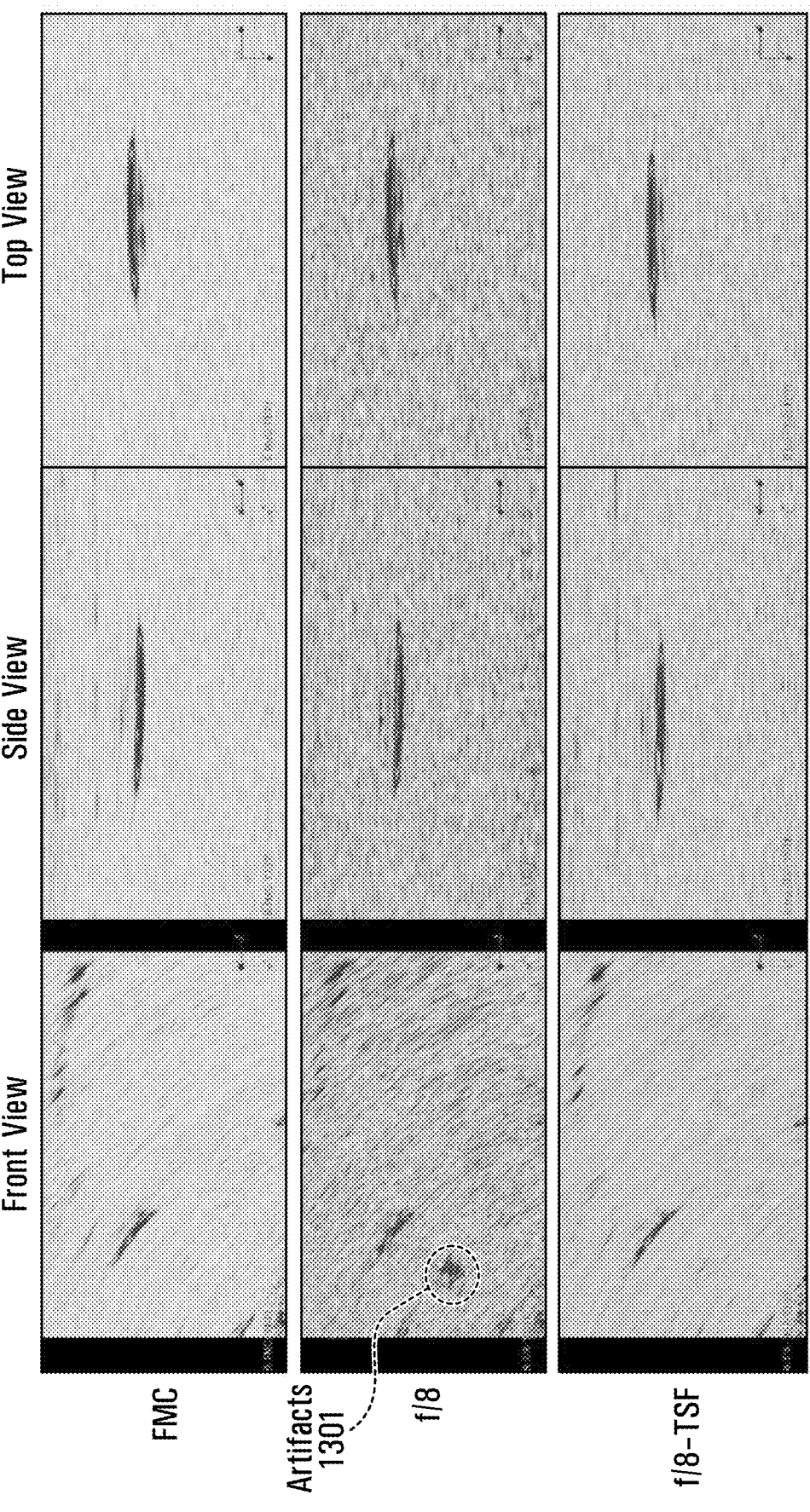
FIG. 13 is a schematic of rendered images for a slag using FMC, sparse firing, and TSF.

Referring now to FIG. 13, shown is a schematic of rendered images for a slag using FMC, sparse firing, and TSF. There are pronounced artefacts 1301 in the f/8 image that are not seen in FMC and f/8 TSF images. Again, TSF appears to achieve image quality that is more comparable to FMC than traditional sparse firing.

Figure 14:
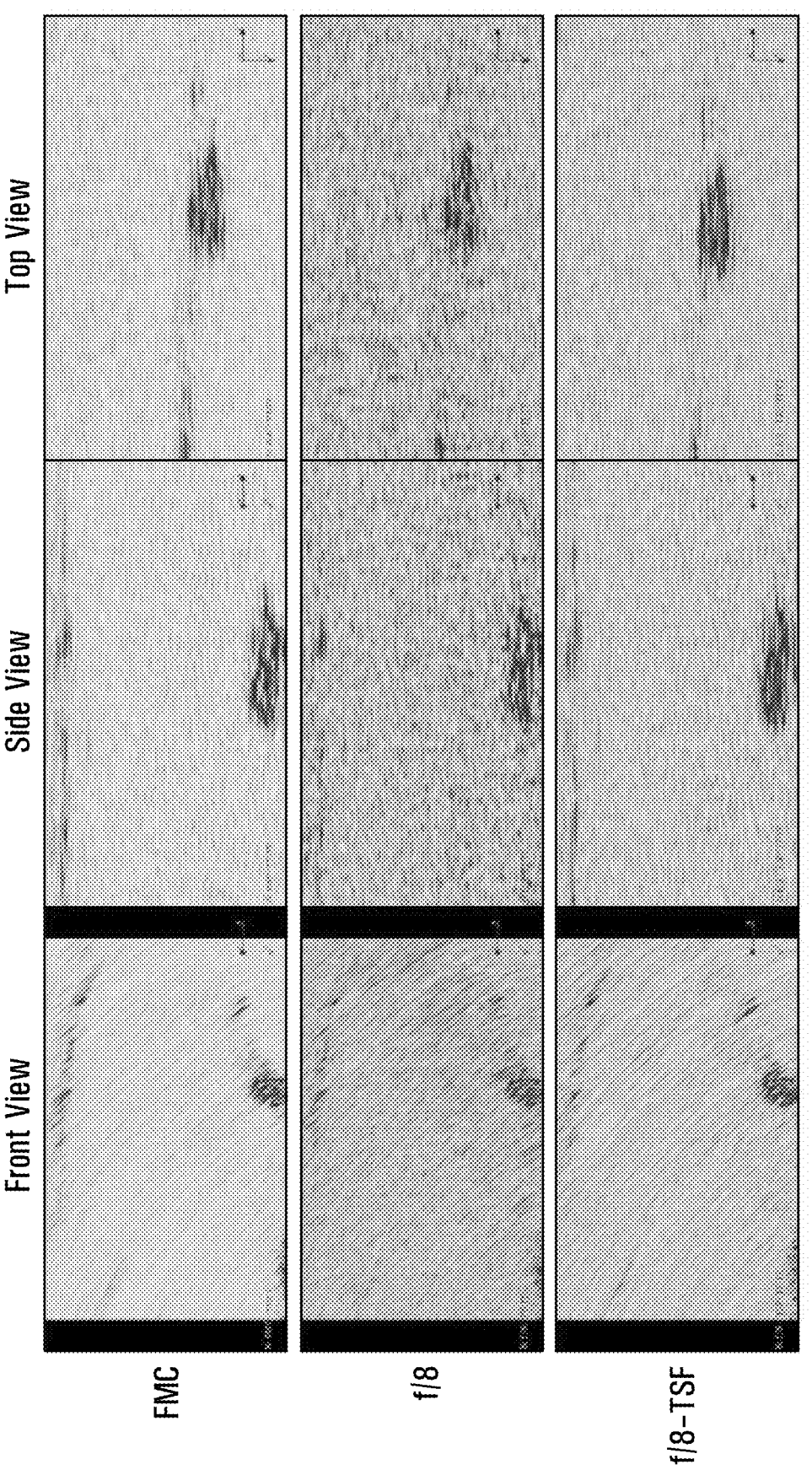
FIG. 14 is a schematic of rendered images of a root crack using FMC, sparse firing, and TSF.

Referring now to FIG. 14, shown is a schematic of rendered images of a root crack using FMC, sparse firing, and TSF. There is mild distortion of f/8 TSF observed in top and side views, which is likely due to moving average process. Image features varying on a scale less than subsequence length blended together. Nonetheless, TSF appears to achieve image quality that is better than traditional sparse firing.

Figure 15:
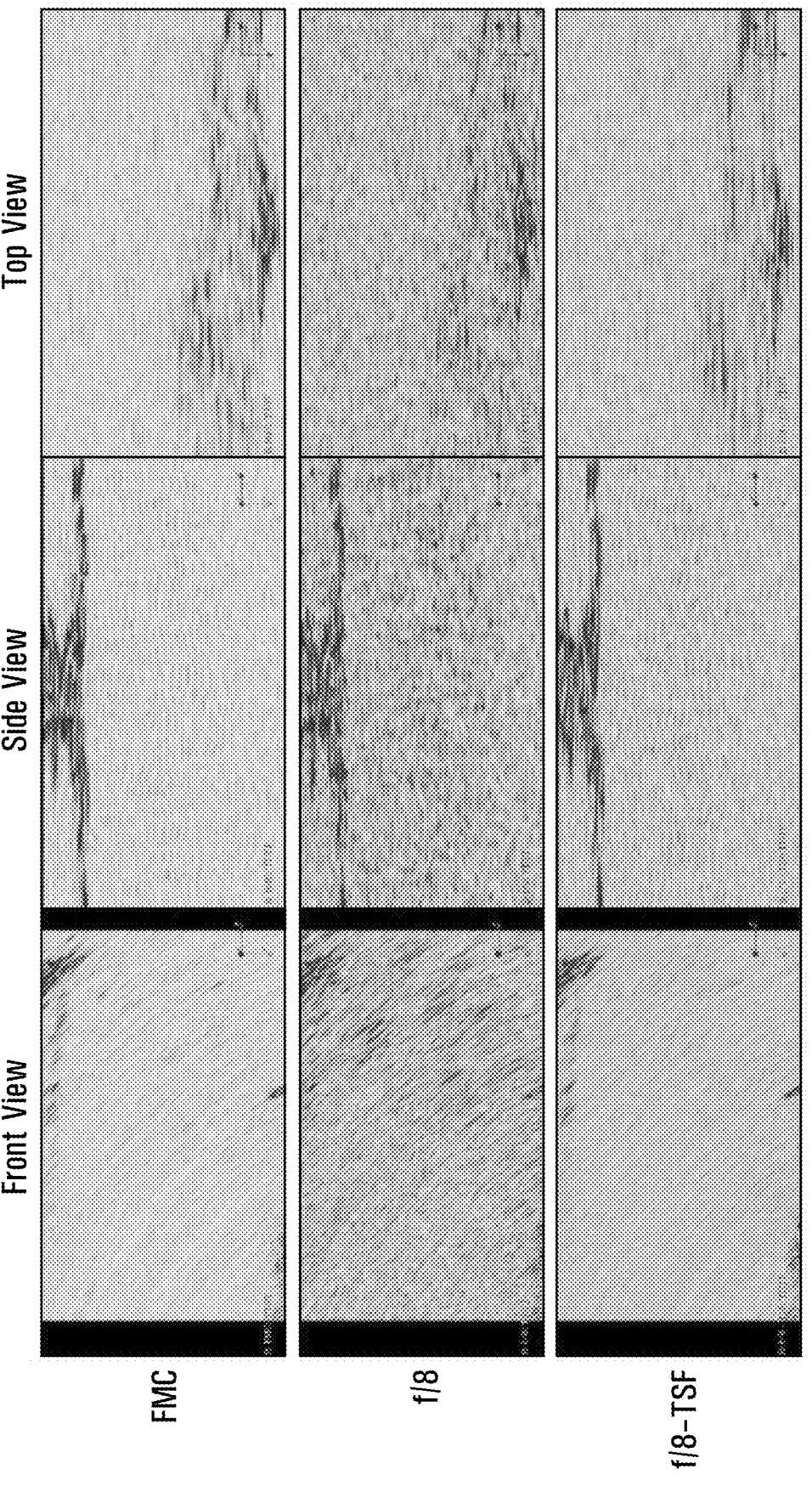
FIG. 15 is a schematic of rendered images for an LOF (Lack of Fusion) using FMC, sparse firing, and TSF.

Referring now to FIG. 15, shown is a schematic of rendered images for an LOF (Lack of Fusion) using FMC, sparse firing, and TSF. There is mild distortion of f/8 TSF observed in top and side views. Similar background noise levels are observed in FMC and f/8 imaging modes. Nonetheless, generally higher SNR is observed in f/8 TSF compared with f/8 throughout the scan.

Post-Processing

Post-processing can be performed for the weld plate results. A more accurate depth sizing of root crack can be obtained by direct T-T image, as beams in TT-TT image bounce through cap. A height of LOF is ideally obtained via tip diffraction as well, as a tip is not clear on TFM images. Post-processing using PCTFM, also known as VCI (Vector Coherence Imaging), can be useful for highlighting tips and omni-direction scatterers. PCTFM can facilitate diffraction based sizing and highlight facets/textures on cracks and volumetric flaws. A statistical threshold on PCTFM images can be applied to enable robust tip detection tied to phase response of random additive noise, and can be computed using size of image relative to UT wavelength.

Figure 16:
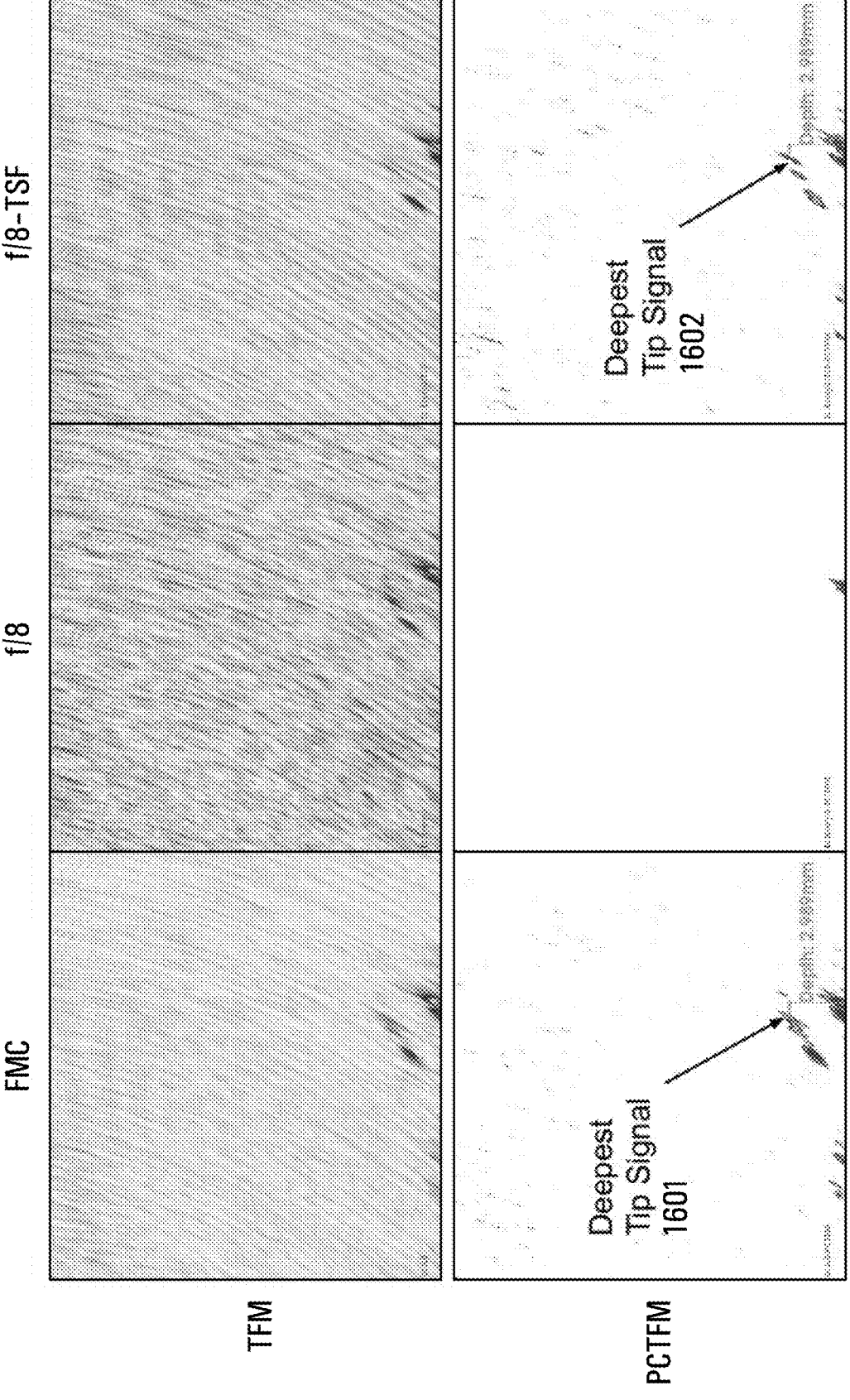
FIG. 16 is a schematic of post-processed images of the root crack using TFM and PCTFM (T-T Mode)

Referring now to FIG. 16, shown is a schematic of post-processed images of the root crack using TFM and PCTFM (T-T Mode). A deepest tip 1601 and 1602 from root crack clearly identified on PCTFM rendering of FMC and f/8 TSF, but not seen with f/8 (true depth=3 mm). Week tip signals not easily identified on any TFM images. Thus, with post-processing, TSF appears to achieve image quality that is more comparable to FMC than traditional sparse firing.

Figure 17:
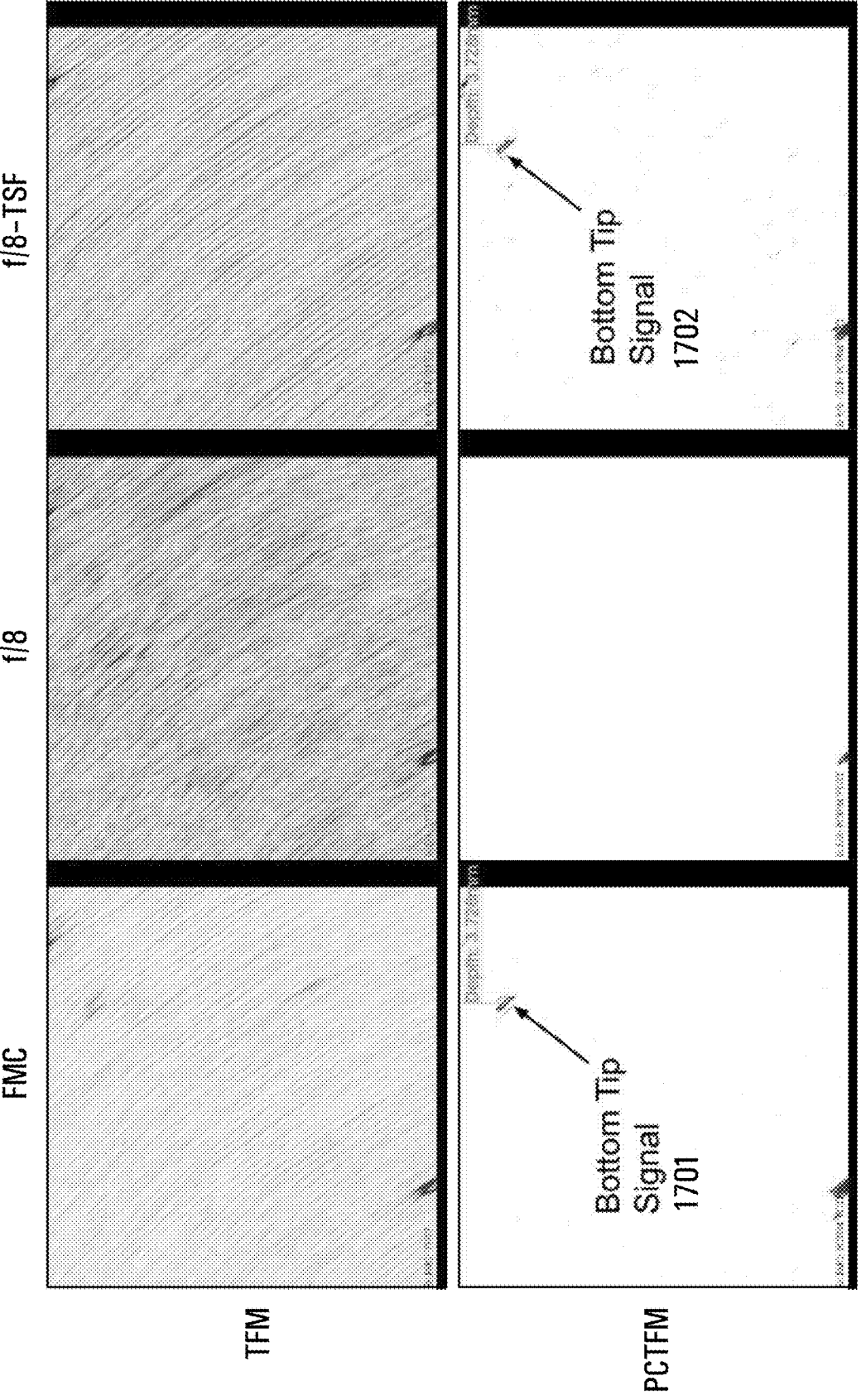
FIG. 17 is a schematic of post-processed images of the LOF using TFM and PCTFM (T-T Mode).

Referring now to FIG. 17, shown is a schematic of post-processed images of the LOF using TFM and PCTFM (T-T Mode). A tip 1701 and 1702 from the bottom of the LOF is clearly identified on PCTFM rendering of FMC and f/8 TSF, but not seen with f/8 (true depth=3 mm). Week tip signals not easily identified on any TFM images. Thus, with post-processing, TSF appears to achieve image quality that is more comparable to FMC than traditional sparse firing.

Based on the foregoing results, TSF is found to provide similar image quality as the complete FMC data set. In particular, TSF observed to provide reduced image artefacts and background noise levels compared with traditional sparse firing sequences with the same data volume (up to transmission element steps of 8). Minor distortions of target images along the scan axis were observed in TSF images, which may be attributed to the moving average process. Tip diffraction signals too faint to be identified in TFM images were clearly detectable in PCTFM images rendered from TSF data but not in images rendered with traditional sparse firing data. Blurring/blending throughout the scan axis can likely be reduced by implementing tapered averaging windows, motion compensation or deconvolution.

Numerous modifications and variations of the present disclosure are possible in light of the above teachings. It is therefore to be understood that within the scope of the appended claims, the disclosure may be practised otherwise than as specifically described herein.

We claim:

1. A method for ultrasonic testing of an object using a phased array ultrasonic probe having a plurality of transducer elements, the method comprising:
   for each position of a plurality of positions of the phased array ultrasonic probe, transmitting an ultrasonic wave into the object using a defined subset of the transducer elements and observing propagation of the ultrasonic wave in the object using receiving elements of the transducer elements to produced raw image data for the position, such that the defined subset changes for adjacent positions of the ultrasonic phased array probe; and
   combining the raw image data of each position to produce an ultrasonic image of the object.

2. The method of claim 1, where combining the raw image data of each position to produce the ultrasonic image of the object comprises:
   for each position of the plurality of positions of the ultrasonic phased array probe, blending the raw image data for the position with the raw image data of nearby positions within a defined boundary to generate rendered image data for the position; and
   combining the rendered image data of each position to produce the ultrasonic image of the object.

3. The method of claim 2, wherein the blending comprises a PCTFM (Phase Coherence Total Focusing Method) operation.

4. The method of claim 2, wherein the blending comprises a DMaS (Delay Multiply and Sum) operation.

5. The method of claim 1, wherein for each position of the phased array ultrasonic probe, the defined subset of the transducer elements that transmit is one-half of the transducer elements of the phased array ultrasonic probe.

6. The method of claim 1, wherein for each position of the phased array ultrasonic probe, the defined subset of the transducer elements that transmit is one-quarter of the transducer elements of the phased array ultrasonic probe.

7. The method of claim 1, wherein for each position of the phased array ultrasonic probe, the defined subset of the transducer elements that transmit is one-eighth of the transducer elements of the phased array ultrasonic probe.

8. The method of claim 1, wherein for each position of the phased array ultrasonic probe, the receiving elements comprise all of the transducer elements of the phased array ultrasonic probe.

9. The method of claim 1, wherein for each position of the phased array ultrasonic probe, transmitting the ultrasonic wave into the object comprises transmitting the ultrasonic wave diagonally into the object relative to an outside surface of the object.

10. The method of claim 1, wherein for each position of the phased array ultrasonic probe, transmitting the ultrasonic wave into the object comprises transmitting the ultrasonic wave orthogonally into the object relative to an outside surface of the object.

11. An FPGA (Field Programable Gate Array) having logic gates that have been synthesized such that, when the FPGA is implemented with an ultrasonic testing apparatus comprising a phased array ultrasonic probe having a plurality of transducer elements, the logic gates configure the ultrasonic testing apparatus to implement the method of claim 1.

12. A non-transitory computer readable medium having recorded thereon statements and instructions that, when executed by a processor of an ultrasonic testing apparatus comprising a phased array ultrasonic probe having a plurality of transducer elements, configure the ultrasonic testing apparatus to implement the method of claim 1.

13. An ultrasonic testing apparatus comprising:
   a phased array ultrasonic probe having a plurality of transducer elements; and
   TSF (Temporal Sparse Firing) circuitry coupled to the phased array ultrasonic probe and configured to control the phased array ultrasonic probe to implement the method of claim 1.

14. The ultrasonic testing apparatus of claim 13, wherein the TSF circuitry comprises an FPGA (Field Programable Gate Array).

15. The ultrasonic testing apparatus of claim 13, wherein the TSF circuitry comprises a processor for executing software.

16. The ultrasonic testing apparatus of claim 13, comprising a TSF module integrating the TSF circuitry, wherein the TSF module is separate from the phased array ultrasonic probe, and wherein the TSF module comprises a user interface including a display configured to display the ultrasonic image of the object.

17. The ultrasonic testing apparatus of claim 13, wherein the TSF circuitry is integrated with the phased array ultrasonic probe.

18. The ultrasonic testing apparatus of claim 13, wherein the phased array ultrasonic probe has an angled configuration such that the ultrasonic waves are transmitted diagonally into the object relative to an outside surface of the object.

19. The ultrasonic testing apparatus of claim 13, wherein the phased array ultrasonic probe has an orthogonal configuration such that the ultrasonic waves are transmitted orthogonally into the object relative to an outside surface of the object.

20. A method for ultrasonic testing of an object using a phased array ultrasonic probe having a plurality of transducer elements, the method comprising:
   for each position of a plurality of positions of the phased array ultrasonic probe, transmitting an ultrasonic wave into the object using a defined subset of the transducer elements and observing propagation of the ultrasonic wave in the object using receiving elements of the transducer elements to produced raw image data for the position, such that the defined subset changes for adjacent positions of the ultrasonic phased array probe; and
   combining the raw image data of each position to produce an ultrasonic image of the object including:
      for each position of the plurality of positions of the ultrasonic phased array probe, blending the raw image data for the position with the raw image data of nearby positions within a defined boundary to generate rendered image data for the position; and
      combining the rendered image data of each position to produce the ultrasonic image of the object; and
   wherein the blending the raw image data comprises a sliding average operation on the raw image data of the nearby positions within the defined boundary, such that the defined boundary slides in a corresponding manner with the each position of the phased array ultrasonic probe.

* * * * *